United States Patent [19]
Yamamoto et al.

[11] Patent Number: 5,416,060
[45] Date of Patent: May 16, 1995

[54] REFRESHING AGENT

[75] Inventors: Akira Yamamoto; Ken'ichi Itoh; Mitsuyoshi Oshima, all of Joetsu; Masatoshi Arai, Annaka; Shigeru Saito, Joetsu, all of Japan

[73] Assignee: Shin-Etsu Chemical Co., Ltd., Tokyo, Japan

[21] Appl. No.: 79,791

[22] Filed: Jun. 23, 1993

[51] Int. Cl.$^6$ .............................................. A01N 3/02
[52] U.S. Cl. ................................. 504/114; 504/121; 504/199
[58] Field of Search ................ 504/114, 121, 199; 71/79, 80

[56] References Cited

U.S. PATENT DOCUMENTS

| | | | |
|---|---|---|---|
| 2,637,738 | 5/1953 | Wagner | 556/479 |
| 2,823,218 | 2/1958 | Speier et al. | 556/479 |
| 3,411,894 | 11/1968 | Lieberman et al. | 504/114 |
| 4,092,145 | 5/1978 | Willard | 504/114 |
| 4,804,768 | 2/1989 | Quirk et al. | |
| 5,015,282 | 5/1991 | Takahashi et al. | 504/114 |
| 5,206,004 | 4/1993 | Park | |

FOREIGN PATENT DOCUMENTS 0262642 4/1988 European Pat. Off.
WO-A-90
10390 9/1990 WIPO.

OTHER PUBLICATIONS

Database WPI, Derwent Publications Ltd., London, G.B. AN91-197882 & JP-A-3 123 439 (Ohtsu Tire K.K.), May 27, 1991, Abstract.

*Primary Examiner*—Paul F. Shaver
*Attorney, Agent, or Firm*—Millen, White, Zelano & Branigan

[57] ABSTRACT

A refreshing agent comprising a compound having a hydrosilyl group and a hydrosilylation catalyst quickly adsorbs ethylene without forming hazardous substances and is thus suitable for keeping vegetables, fruits, and flowers fresh.

15 Claims, No Drawings

REFRESHING AGENT

BACKGROUND OF THE INVENTION

1. Field of the Invention

The present invention relates to a refreshing agent, and more particularly to an agent for keeping vegetables, fruit and flowers fresh by removing ethylene generating therefrom.

2. Prior Art

It is well known that vegetables, fruits and flowers can be kept fresh by removing ethylene generating therefrom. Known agents for removing ethylene include chlorites and hypochlorites as disclosed in Japanese Patent Application Kokai (JP-A) Nos. 39243/1984 and 198938/1988, respectively. These compounds, however, are unsuitable as agents for keeping vegetables, fruits and flowers fresh because they are not only slow in adsorbing ethylene, but also reactive to form hazardous chlorides.

SUMMARY OF THE INVENTION

Therefore, an object of the present invention is to provide a novel and improved refreshing agent capable of adsorbing ethylene at a sufficiently high rate to keep vegetables, fruits and flowers fresh without forming hazardous substances such as chlorides.

The inventors found that a composition comprising a compound having a hydrosilyl group and a hydrosilylation catalyst is a useful refreshing agent which can quickly remove ethylene given off from vegetables, fruits and flowers without forming hazardous substances. The refreshing agent is typically carried on a support.

More specifically, a compound having a hydrosilyl group ($\equiv$Si—H) is susceptible to addition reaction with ethylene in the presence of a hydrosilylation catalyst such as platinum compounds as shown by the following reaction scheme.

Because of an increased ethylene adsorption rate and addition reaction forming no hazardous substances, the agent is effective for keeping vegetables, fruits and flowers fresh.

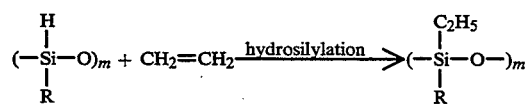

DETAILED DESCRIPTION OF THE INVENTION

As mentioned above, the refreshing agent of the present invention is comprised of a compound having a hydrosilyl group and a hydrosilylation catalyst as essential components.

The compounds having a hydrosilyl group include hydrogensilanes represented by the following formula (1) and organohydrogensiloxanes represented by the following formula (2).

$$R_n SiH_{4-n} \quad (1)$$

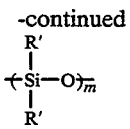

wherein R denotes a monovalent hydrocarbon group having 1 to 10 carbon atoms, R' denotes hydrogen atom or a monovalent hydrocarbon group having 1 to 10 carbon atoms with the proviso that at least one of R's is hydrogen atom, n is an integer of 1 to 3, and m is an integer of 2 to 1000.

Examples of the monovalent hydrocarbon group are alkyl groups, alkenyl groups, aryl groups, haloalkyl groups, haloaryl groups and the like.

The hydrogensilanes include triethoxysilane, etc. The organohydrogensiloxanes include linear organohydrogensiloxanes and cyclic organohydrogensiloxanes. Examples of them are methylhydrogenpolysiloxanes and low molecular weight siloxanes such as tetramethyltetrasiloxane, pentamethylpentasiloxane, dimethyl siloxanes and the like. Both ends of the linear organohydrogensiloxanes may be terminated with an R' group.

The hydrosilylation catalysts include metals belonging to Group VIII in the Periodic Table and compounds thereof, for example, compounds of platinum (Pt), rhodium (Rh), and ruthenium (Ru), such as $H_2PtCl_6$, $PtCl_2[P(C_6H_5)_3]_2$, $RhCl[P(C_6H_5)_3]_3$, and $RuCl_2[P(C_6H_5)_3]_3$. The hydrosilylation catalyst is preferably used in an amount of about 1 to 2,000, preferably 10 to 2,000 parts by weight of metal compound per million parts by weight of the compound having a hydrosilyl group.

In addition to the compound having a hydrosilyl group and hydrosilylation catalyst, the refreshing agent of the invention may contain optional components, for example, other siloxane compounds and other metal compounds, especially de-oxygenating agents.

The refreshing agent of the invention may be used directly in the form of a mixture of the essential components, or by admixing into gas permeable plastic film such as polyolefin film. However, better results are obtained when the refreshing agent is carried on a support in the form of a porous material, for example, active carbon, alumina, silica, silica-alumina, talc, Hormite groups such as attapulgite and sepiolite, diatomaceous earth, woven fabric, non-woven fabric, and silicone sponge. Calcium carbonate and calcium carbonate-containing ore adsorbents are also preferred. In this regard, the refreshing agent is carried in an amount of about 1 to 80%, preferably 2 to 80%, more preferably 2 to 30% by weight of the support. The support can be loaded with the refreshing agent, for example, by dissolving the agent in a diluent such as liquid paraffin and silicone fluid or dissolving the agent in a solvent such as toluene, and admixing the solution with the support as by spraying, followed by optional drying.

Among the supports, talc, Hormite groups, calcium carbonate and calcium carbonate-containing minerals are preferable because the ethylene adsorbing effect is maintained even in high humidity conditions.

For practical use, the refreshing agent is contained in a gas permeable bag which is placed in a container for receiving vegetables, fruits and flowers. Alternatively, the agent is contained in a communicating compartment of such a container.

EXAMPLE

Examples of the invention are given below by way of illustration and not by way of limitation.

Example 1

A refreshing agent was prepared by mixing 5 grams of methylsiloxane polymer of formula (a) having a degree of polymerization (n) of 50 and 5.0 grams of a 0.5% toluene solution of chloroplatinic acid ($H_2PtCl_6$) and blending the mixture with 5 grams of particulate active carbon of about 300 μm by agitation for loading the carbon with the active ingredients.

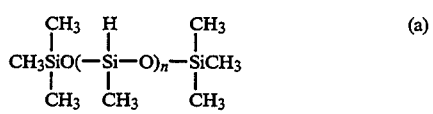

(a)

The refreshing agent, 1 gram, was contained in a container made of polyvinyl-fluoride having a volume of 300 ml, into which 0.56 ml of ethylene gas was admitted (corresponding to 2,000 ppm). The container was kept at 20° C. Using a micro-syringe, the gas in the container was sampled at predetermined intervals for measuring an ethylene concentration by an FID gas chromatograph.

The ethylene concentration was found to be 11 ppm after 30 minutes and 0 ppm after one hour, indicating that ethylene was quickly removed through hydrosilylation.

Example 2

A refreshing agent was prepared by mixing 5 grams of tetramethylsiloxane, 3 mg of chlorotrisphenylphosphinorhodium $RhCl[P(C_6H_5)_3]_3$, and 5 grams of liquid paraffin and blending the mixture with 3 grams of silica powder by agitation.

Using 1 gram of this refreshing agent, an ethylene removal test was carried out as in Example 1. The ethylene concentration was found to be 13 ppm after 30 minutes and 0 ppm after one hour.

Example 3

A refreshing agent was prepared by dissolving 2 grams of the methylsiloxane polymer used in Example 1 and 1 gram of liquid paraffin in 20 grams of toluene, adding 0.05 grams of a 0.5% toluene solution of chloroplatinic acid ($H_2PtCl_6$) to the solution, and adding 15 grams of talc thereto. While agitating the mixture, the toluene was distilled out in vacuum. There was obtained a refreshing agent supported on talc.

The refreshing agent, 2 grams, was contained in a nylon non-woven fabric bag of 2 cm×3 cm and an ethylene removal test was carried out as in Example 1. The ethylene concentration was found to be 15 ppm after 30 minutes and 0 ppm after one hour.

Next, gauses to which 10 g of water was impregnated was put in the same container as in Example 1 to allow the inside of the container to become highly humid. Then 2 g of the refreshing agent contained in the nylon non-woven fabric bag was put in the container and an ethylene removal test was carried out in the same manner as above. The ethylene concentration was found to be 22 ppm after 30 minutes and 0 ppm after one hour.

Example 4

The refreshing agent prepared in Example 1, 1 gram, was packed in a paper bag, which was placed in a polyethylene bag together with five apples (race Tsugaru). With the bag sealed, the apples were stored for 40 days at room temperature. As a control, five apples were sealed in a polyethylene bag without the refreshing agent and similarly tested.

The apples stored without the refreshing agent became stale whereas the apples stored together with the refreshing agent were kept fresh.

Examples 5 to 7

Example 3 was repeated except that attapulgite, sepiolite or calcium carbonate was used instead of talc to conduct the ethylene-removing tests at dry and humid atmospheres. The results are shown in Table 1.

TABLE 1

| | Ethylene concentration (ppm) | | | |
| | Dry atmosphere | | Humid atmosphere | |
| Support | after 30 min. | after 1 hr. | after 30 min. | after 1 hr. |
| --- | --- | --- | --- | --- |
| Example 5 attapulgite | 35 | 0 | 42 | 0 |
| Example 6 sepiolite | 46 | 0 | 48 | 0 |
| Example 7 calcium carbonate | 18 | 0 | 23 | 0 |

There has been described a refreshing agent which adsorbs ethylene at an accelerated rate without forming hazardous substances like chlorides and is thus suitable for keeping fresh vegetables, fruits, flowers and other plants.

Although some preferred embodiments have been described, many modifications and variations may be made thereto in the light of the above teachings. It is therefore to be understood that within the scope of the appended claims, the invention may be practiced otherwise than as specifically described.

We claim:

1. A method for keeping fresh a plant which generates ethylene gas, which comprises placing the plant in proximity to a refreshing agent which comprises a hydrosilylation catalyst and a compound having a hydrosilyl group, such that the refreshing agent removes ethylene gas generated by the plant.

2. The method of claim 1, wherein the plant is a fruit, vegetable or flower.

3. The method of claim 1, wherein the compound having a hydrosilyl group is a hydrogensilane or organohydrogensiloxane.

4. The method of claim 3, wherein the compound having a hydrosilyl group is a hydrogensilane or organohydrogensiloxane of the formulae (1) or (2):

wherein in formula (2) the compound is cyclic or terminated by two further R' groups, and wherein R is a monovalent hydrocarbon group of 1 to 10 carbon atoms, R' is hydrogen or a monovalent hydrocarbon group of 1 to 10 carbon atoms, provided that at least one R' is hydrogen, n is an integer of 1 to 3 and m is an integer of 2 to 1000.

5. The method of claim 1, wherein the compound having a hydrosilyl group is a low molecular weight organohydrogensiloxane.

6. The method of claim 1, wherein the compound having a hydrosilyl group is an organohydrogensiloxane polymer.

7. The method of claim 1, wherein the hydrosilylation catalyst is a Group VIII metal or a compound containing a Group VIII metal.

8. The method of claim 1, wherein the hydrosilylation catalyst is a compound containing a Group VIII metal and is present in an amount of 10 to 2,000 parts by weight per million parts by weight of the compound having a hydrosilyl group.

9. The method of claim 1, wherein the hydrosilylation catalyst is a platinum metal-containing compound.

10. The method of claim 1, wherein the refreshing agent further comprises a porous material carrying the compound having a hydrosilyl group and the hydrosilylation catalyst.

11. The method of claim 10, wherein the porous material is talc.

12. The method of claim 10, wherein the porous material is a hormite group material.

13. The method of claim 10, wherein the porous material is calcium carbonate or a calcium carbonate-containing ore adsorbent.

14. The method of claim 1, wherein the plant and the refreshing agent are placed in the same container.

15. The method of claim 14, wherein the refreshing agent is placed in a gas permeable bag which is placed in the same container as the plant.

* * * * *